US006744006B2

(12) United States Patent
Johnson et al.

(10) Patent No.: US 6,744,006 B2
(45) Date of Patent: Jun. 1, 2004

(54) TWIN PLASMA TORCH APPARATUS

(75) Inventors: Timothy Paul Johnson, Gloucestershire (GB); David Edward Deegan, Gloucestershire (GB); Christopher David Chapman, Gloucestershire (GB); John Kenneth Williams, Oxfordshire (GB)

(73) Assignee: Tetronics Limited, Oxon (GB)

( * ) Notice: Subject to any disclaimer, the term of this patent is extended or adjusted under 35 U.S.C. 154(b) by 0 days.

(21) Appl. No.: 10/257,346

(22) PCT Filed: Apr. 4, 2001

(86) PCT No.: PCT/GB01/01545

§ 371 (c)(1),
(2), (4) Date: Apr. 1, 2003

(87) PCT Pub. No.: WO01/78471

PCT Pub. Date: Oct. 18, 2001

(65) Prior Publication Data

US 2003/0160033 A1 Aug. 28, 2003

(30) Foreign Application Priority Data

Apr. 10, 2000 (GB) ............................................ 0008797
Sep. 19, 2000 (GB) ............................................ 0022986

(51) Int. Cl.$^{7}$ ................................................ B23K 10/00

(52) U.S. Cl. ............... 219/121.51; 219/75; 219/121.47; 219/76.16; 219/121.36

(58) Field of Search ....................... 219/121.48, 121.36, 219/121.52, 121.51, 121.59, 74, 75, 76.16, 76.15, 121.47

(56) References Cited

U.S. PATENT DOCUMENTS 2,284,551 A 5/1942 Alexander
3,989,512 A 11/1976 Sayce
4,112,288 A 9/1978 Pieren et al.
4,194,107 A 3/1980 Klasson
4,238,427 A 12/1980 Chisholm
4,638,488 A 1/1987 Shimomoto
4,861,961 A 8/1989 Huys
4,877,937 A 10/1989 Muller
5,263,521 A 11/1993 Brossard et al.
5,332,885 A 7/1994 Landes
5,408,066 A 4/1995 Trani et al.
5,420,391 A 5/1995 Delcea
5,481,080 A 1/1996 Lynum et al.
5,593,740 A 1/1997 Struban et al.
6,063,243 A 5/2000 Zettl et al.
6,146,505 A 11/2000 Murakami et al.

FOREIGN PATENT DOCUMENTS

DE 2755213 6/1979
EP 0 510 816 A2 10/1992
EP 0615083 A 9/1994

(List continued on next page.)

OTHER PUBLICATIONS

Ageorges H. et al: "Synthesis of Aluminum Nitride in Trnasferred Arc Plasma Furnaces" Plasma Chemistry & Plasma Processing, US, Plenum Press, New York, vol. 13, No. 4, Dec. 13, 1993.

Database WPI Section Ch, Week 197813 Derwent Pub. Ltd., London, GB; AN 1978–23971A XP002170899.

*Primary Examiner*—Mark Paschall
(74) *Attorney, Agent, or Firm*—Morris, Manning & Martin, LLP

(57) ABSTRACT

A twin plasma torch assembly includes two plasma torch assemblies supported in a housing. Each of the two plasma torch assemblies has an electrodes. Plasma gas is introduced into a processing zone around the two electrodes. A shroud gas is introduced to surround the plasma. A feed tube is provided to supply feed material to the processor.

27 Claims, 9 Drawing Sheets

FOREIGN PATENT DOCUMENTS

| | | | |
|---|---|---|---|
| EP | 0 776 502 | | 4/1997 |
| FR | 2 450 548 | | 9/1980 |
| GB | 1 010263 | | 11/1965 |
| GB | 1 142 793 | | 2/1969 |
| GB | 1 164 810 | | 9/1969 |
| GB | 1 339 054 | | 11/1973 |
| GB | 2 273 027 | | 6/1994 |
| JP | 55 046603 | B | 4/1980 |
| JP | 58031825 | A | 2/1983 |
| JP | 63 147182 | A | 6/1988 |
| JP | 32 64601 | A | 11/1991 |
| JP | 06080410 | | 3/1994 |
| JP | 05082806 | A | 9/1994 |
| JP | 06272047 | | 9/1994 |
| JP | 62 99209 | A | 10/1994 |
| JP | 07300116 | A | 11/1995 |
| JP | 1059485 | | 8/1996 |
| JP | 8243756 | | 9/1996 |
| JP | 872 43756 | A | 9/1996 |
| JP | 10216959 | A | 8/1998 |
| WO | WO 9415864 | A | 7/1994 |
| WO | WO 99/31296 | | 6/1999 |

TWIN PLASMA TORCH APPARATUS

The invention relates to a twin plasma torch apparatus.

In a twin plasma torch apparatus, the two torches are oppositely charged i.e. one has an anode electrode and the other a cathode electrode. In such apparatus, the arcs generated by each electrode are coupled together in a coupling zone remote from the two torches. Plasma gases are passed through each torch and are ionised to form a plasma which concentrates in the coupling zone, away from torch interference. Material to be heated/melted may be directed into this coupling zone wherein the thermal energy in the plasma is transferred to the material. Twin plasma processing can occur in open or confined processing zones.

Twin plasma apparatus are often used in furnace applications and have been the subject of previous patent applications, for example EP0398699 and U.S. Pat. No. 5,256,855.

The twin arc process is energy efficient because as the resistance of the coupling between the two arcs increases remote from the two torches, the energy is increased but torch losses remain constant. The process is also advantageous in that relatively high temperatures are readily reached and maintained. This is attributable to both the fact that the energy from the two torches is combined and also because of the above mentioned efficiency.

However, such processes have disadvantages. If the plasma torches are in close proximity to one another and/or are enclosed within a small space, there is a tendency for the arcs to destabilise, particularly at higher voltages. This side-arcing occurs when the arcs preferentially attach themselves to lower resistance paths.

The problem of side-arcing in current twin torch apparatus has lead to the development of open processing units in which the plasma torches are substantially spaced apart, with low resistance paths removed from vicinity, as described in U.S. Pat. No. 5,104,432. In such units, the process gas is free to expand in all directions in these applications. However, such arrangements are not suitable for all processing applications, particularly when expansion of process gases needs to be controlled e.g. production of ultra fine powders.

In current systems with confined processing zones, the torch nozzles project into the chamber so that the chamber walls, which have a low resistance, are removed from the vicinity of the plasma arc. This awkward construction inhibits side-arcing and encourages coupling of the arcs. However, the protruding nozzles provide surfaces on which melted material may precipitate. This not only results in wastage of material but shortens the life of the torches.

The present invention provides a twin plasma torch assembly comprising:

(a) at least two twin plasma torch assemblies of opposite polarity supported in a housing, said assemblies being spaced apart from one another and each comprising
  (i) a first electrode,
  (ii) a second electrode which is or is adapted to be spaced apart from the first electrode by a distance sufficient to achieve a plasma arc therebetween in a processing zone;
(b) means for introducing a plasma gas into the processing zone between the first and second electrodes;
(c) means for introducing shroud gas to surround the plasma gas;
(d) means for supplying feed material into the processing zone; and
(e) means for generating a plasma arc in the processing zone.

The shroud gas confines the plasma gas, inhibits side-arcing, and increases plasma density. The invention therefore provides an assembly in which the torches are inhibited from side-arcing, and thus facilitates the miniaturisation of torch design where distance to low resistance paths are small. The use of shroud gas can also eliminate the need for torch nozzles to extend beyond the housing.

The shroud gas may be provided at various locations along the electrodes, particularly in cylindrical torches where arcs are generated along the length of the electrodes. However, preferably, each torch has a distal end for the discharge of plasma gas and the means for supplying shroud gas provides shroud gas downstream of the distal end of each electrode. Therefore, reactive gases such as oxygen may be added to the plasma without degrading the electrode. The practical applicability of plasma torches is increased by the facility to add reactive gases downstream of the electrode.

In a preferred embodiment, each plasma torch comprises a housing which surrounds the electrode to define a shroud gas supply duct between the housing and the electrodes, wherein the end of the housing is tapered inwards towards the distal end of the torch to direct flow of the shroud gas around the plasma gas.

The twin plasma torch assembly of the present invention may be used in an arc reactor having a chamber to carry out a plasma evaporation process to produce ultra-fine (i.e. sub-micron or nano-sized) powders, for example aluminium powders. The reactor may also be used in a spherodisation process.

The chamber will typically have an elongate or tubular form with a plurality of orifices in a wall portion thereof, a twin plasma torch assembly being mounted over each orifice. The orifices, and thus the twin plasma torch assemblies, may be provided along and/or around said tubular portion. The orifices are preferably provided at substantially regular intervals.

The distal ends of the first and/or second electrodes, for the discharge of plasma gas will typically be formed from a metallic material, but may also be formed from graphite.

The plasma arc reactor preferably further comprises cooling means for cooling and condensing material which has been vaporised in the processing zone. The cooling means comprises a source of a cooling gas or a cooling ring.

The plasma arc reactor will typically further comprise a collection zone for collecting processed feed material. The process feed material will typically be in the form of a powder, liquid or gas.

The collection zone may be provided downstream of the cooling zone for collecting a powder of the condensed vaporised material. The collection zone may comprise a filter cloth which separates the powder particulate from the gas stream. The filter cloth is preferably mounted on an earthed cage to prevent electrostatic charge build up. The powder may then be collected from the filter cloth, preferably in a controlled atmosphere zone. The resulting powder product is preferably then sealed, in inert gas, in a container at a pressure above atmospheric pressure.

The plasma arc reactor may further comprise means to transport processed feed material to the collection zone. Such means may be provided by a flow of fluid, such as, for example, an inert gas, through the chamber, wherein, in use, processed feed material is entrained in the fluid flow and is thereby transported to the collection zone.

The means for generating a plasma arc in the space between the first and second electrodes will generally comprise a DC or AC power source.

The apparatus according to the present invention may operate without using any water-cooled elements inside the plasma reactor and allows replenishment of feed material without stopping the reactor.

The means for supplying feed material into the processing zone may be achieved by providing a material feed tube which is integrated with the chamber and/or the twin torch assembly. The material may be particulate matter such as a metal or may be a gas such as air, oxygen or hydrogen or steam to increase the power at which the torch assembly operates.

Advantageously, the distal ends of first and second electrodes, for the discharge of plasma gas, do not project into the chamber.

The small size of the compact twin torch arrangement according to the present invention allows many units to be installed onto a product transfer tube. This enables easy scale-up to typically over 10 times to give a full production unit without scale up uncertainty.

The present invention also provides a process for producing a powder from a feed material, which process comprises:

(A) providing a plasma arc reactor as herein defined;

(B) introducing a plasma gas into the processing zones between the first and second electrodes;

(C) generating a plasma arc in the processing zones between the first and second electrodes;

(D) supplying feed material into the plasma arcs, whereby the feed material is vaporised;

(E) cooling the vaporised material to condense a powder; and (F) collecting the powder.

The feed material will generally comprise or consist of a metal, for example aluminium or an alloy thereof. However, liquid and/or gaseous feed materials can also be used. In the case of a solid feed, the material may be provided in any suitable form which allows it to be fed into the space between the electrodes, i.e, into the processing zone. For example, the material may be in the form of a wire, fibres and/or a particulate.

The plasma gas will generally comprise or consist of an inert gas, for example helium and/or argon.

The plasma gas is advantageously injected into the space between the first and second electrodes, i.e. the processing zone.

At least some cooling of the vaporised material may be achieved using an inert gas stream, for example argon and/or helium. Alternatively, or in combination with the use of an inert gas, a reactive gas stream may be used. The use of a reactive gas enables oxide and nitride powders to be produced. For example, using air to cool the vaporised material can result in the production of oxide powders, such as aluminium oxide powders. Similarly, using a reactive gas comprising, for example, ammonia can result in the production of nitride powders, such as aluminium nitride powders. The cooling gas may be recycled via a water-cooled conditioning chamber.

The surface of the powder may be oxidised using a passivating gas stream. This is particularly advantageous when the material is a reactive metal, such as aluminium or is aluminium-based. The passivating gas may comprise an oxygen-containing gas.

It will be appreciated that the processing conditions, such as material and gas feed rates, temperature and pressure, will need to be tailored to the particular material to be processed and the desired size of the particles in the final powder.

It is generally preferable to pre-heat the reactor before vaporising the solid feed material. The reactor may be preheated to a temperature of at least about 2000° C. and typically approximately 2200° C. Pre-heating may be achieved using a plasma arc.

The rate at which the solid feed material is fed into the channel in the first electrode will affect the product yield and powder size.

For an aluminium feed material, the process according to the present invention may be used to produce a powdered material having a composition based on a mixture of aluminium metal and aluminium oxide. This is thought to arise with the oxygen addition made to the material during processing under low temperature oxidation conditions.

Specific embodiments of the present invention will now be described in detail with reference to the following figures (drawn approximately to scale) in which.

Figure 1:
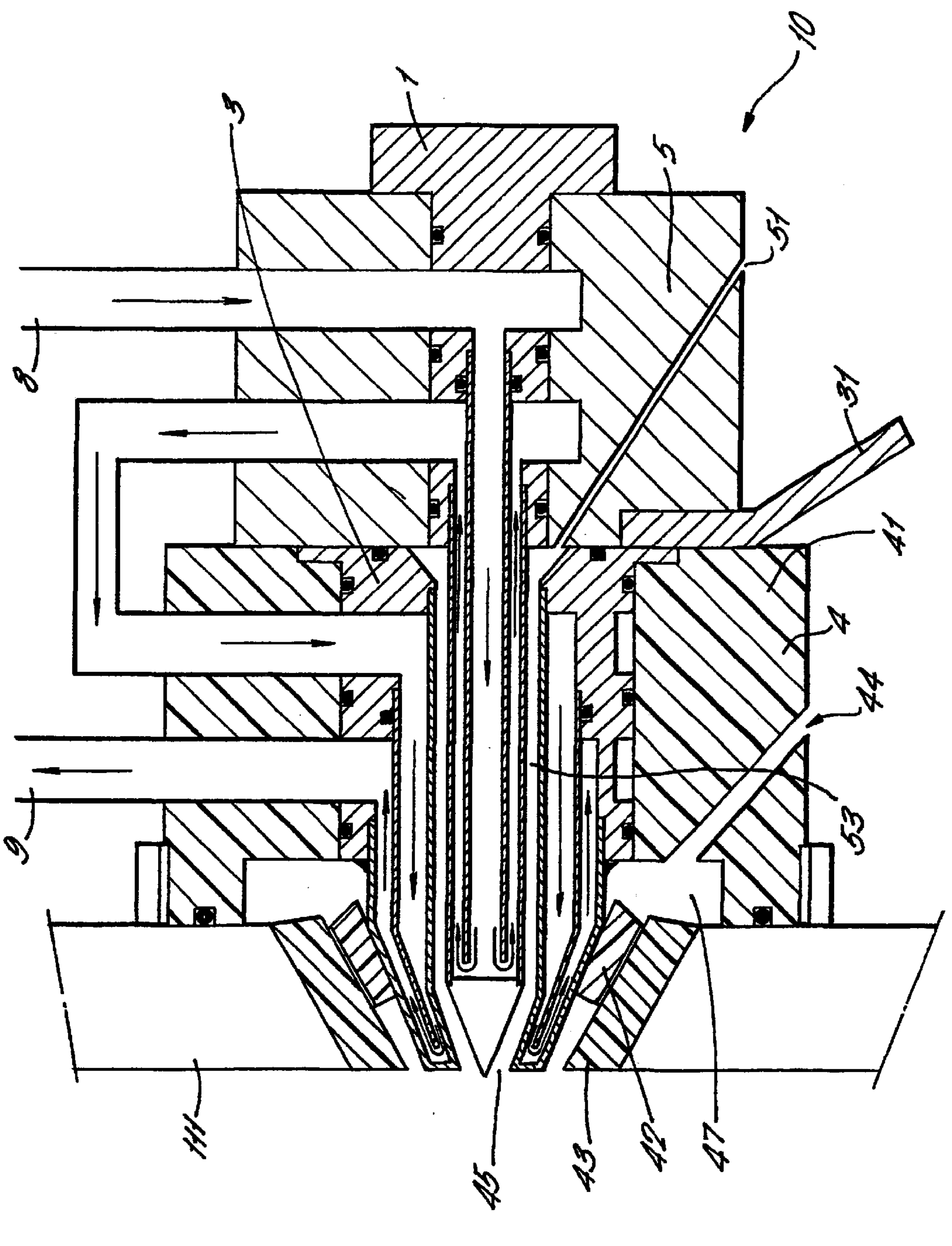
FIG. 1 is a cross section of a cathode torch assembly.
Figure 2:
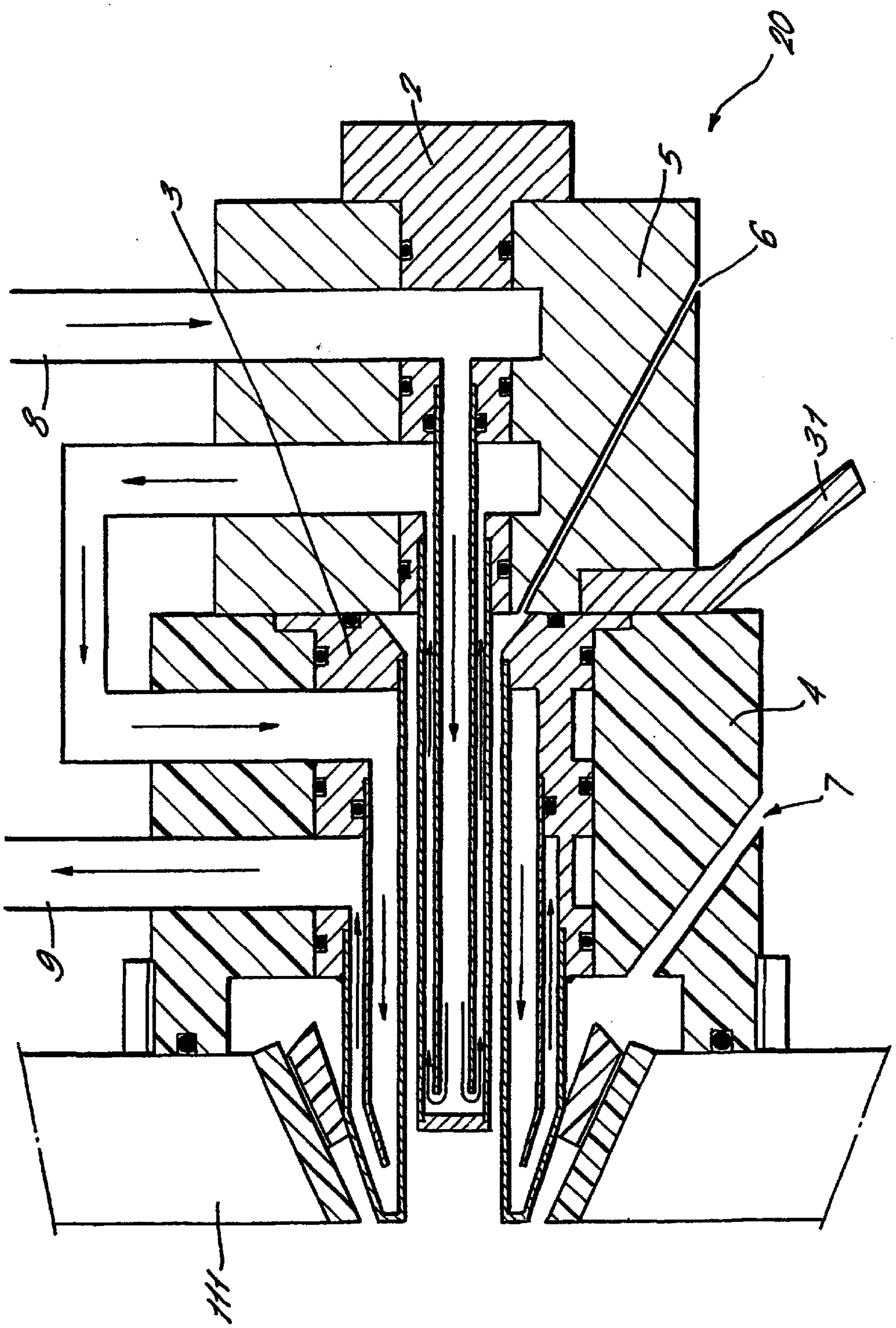
FIG. 2 is a cross section of an anode torch assembly.
Figure 3:
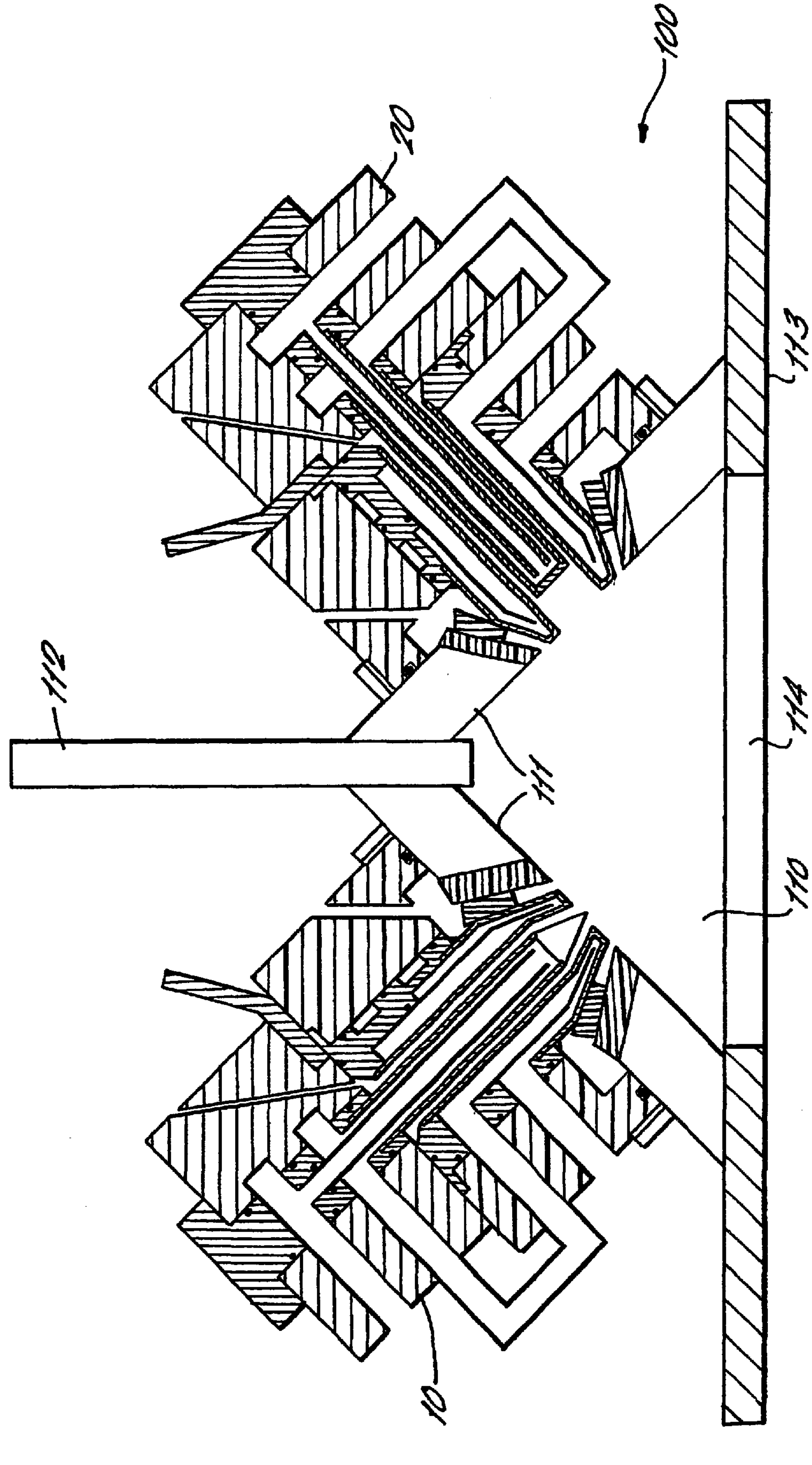
FIG. 3 shows a portable twin torch assembly comprising the anode and cathode torch assemblies of FIGS. 1 and 2, mounted onto a confined processing chamber.

FIGS. 1 and 2 are cross sections of assembled cathode 10 and anode 20 torch assemblies respectively. These are of modular construction each comprising an electrode module 1 or 2, a nozzle module 3, a shroud module 4, and a electrode guide module 5.

Basically, the electrode module 1, 2 is in the interior of the torch 10, 20. The electrode guide module 5 and the nozzle module 3 are axially spaced apart surrounded the electrode module 1, 2 at locations along its length. At least the distal end (i.e. the end from which plasma is discharged from the torch) of the electrode module 1, 2 is surrounded by the nozzle module 3. The proximal end of the electrode module 1 or 2 is housed in the electrode guide module 5. The nozzle module 3 is housed in the shroud module 4.

Sealing between the various modules and also the module elements is provided by "O" rings. For example, "O" rings provide seals between the nozzle module 3 and both the shroud module 4 and electrode guide module 5. Throughout the figures of the specification, "O" rings are shown as small filled circles within a chamber.

Each torch 10, 20 has ports 51 and 44 for entry of process gas and shroud gas respectively. Entry of process gas is towards the proximal end of the torch 10, 20. Process gas enters a passage 53 between the electrode 1 or 2 and the nozzle 3 and travels towards the distal end of the torch 10, 20. In this particular embodiment, shroud gas is provided at the distal end of the torch 10, 20. This keeps shroud gas away from the electrode and is particularly advantageous when using a shroud gas which may degrade the electrode modules 1, 2, e.g. oxygen. However, in other embodiments, the shroud gas could enter towards the proximal end of the torch 10, 20.

The shroud module 4 is fitted at the distal end of the torch 10, 20. The shroud module 4 comprises a nozzle guide 41, a shroud gas guide 42, an electrical insulator 43, a chamber wall 111, and also a seat 46. An "O" ring is provided to seal the chamber wall 111 and the nozzle guide 41. Optionally, coolant fluid may also be transported within the chamber wall 111.

The electrical insulator 43 is located on the chamber wall 111 such that there is no low resistance path at the distal end of the torch to facilitate arc destabilisation. The electrical insulator 43 is typically made of boron nitride or silicon nitride.

The shroud gas guide 42 is located on the electrical insulator 43 and provides support for the distal end of the nozzle module 3 and also allows flow of shroud gas out of the distal end of the torch. It is typically made from PTFE.

The nozzle guide 41 is made of an electrical insulator, such as PTFE, and is used to locate the nozzle module 3 in the shroud module 4. The nozzle guide 41 also contains a passage 44 through which shroud gas is fed to an chamber 47. Shroud gas exits from the chamber 47 through passages 45 located in the shroud gas guide 42. These passages 45 are along the contact edge with the electrical insulator 43.

Although shroud gas is shown to be delivered to the torch 10, 20 using a specific arrangement for the shroud gas module 4 (FIG. 8), delivery may be by other means. For example, shroud gas may be delivered near the proximal end of the torch, through a passage surrounding the process gas passage 51. The shroud gas may also be delivered to an annular ring located at and offset from the distal end of the torch.

The electrode guide module 5 conveniently provides a passage or port 51 for the entry of process gas. The internal proximal end of the nozzle module 3 is advantageously chamfered to direct flow of process gas from the passage 51 into the nozzle module 3 and around the electrode.

The electrode guide module 5 needs to be correctly circumferentially aligned such that the electrode guide cooling circuit and the torch cooling circuit (discussed below) align.

The nozzle module 3 and electrode modules 1 and 2 have cooling channels for the circulation of cooling fluid. The cooling circuits are combined into a single circuit in which cooling fluid enters the torch through an single torch entry port 8 and exits torch out of a single torch exit port 9. The cooling fluid enters through the entry port 8 travels through the electrode module 1, 2 to the nozzle module 3, and then exits out of the torch through a nozzle exit port 9. The fluid which leaves the nozzle exit port 9 is transported to a heat exchanger to provide cooled fluid which is recirculated to the entry port 8.

Looking at the flow of cooling fluid through the modules in detail, fluid entering from the torch entry port 8 is directed to an electrode entry port 81. Cooling fluid enters the electrode near its proximal end and travels along a central passage to the distal end wherein it is redirected back to flow along a surrounding outer passage (or number of passages) and out of an electrode exit port 91. This fluid enters the nozzle at entry port 82 and flows along interior passages to the distal end of the nozzle. It is then directed back along surrounding passages to the exit from the nozzle port 92. The fluid is directed to the torch exit port 9.

Any fluid which acts as an effective coolant may be used in the cooling circuit. When water is used, the water should preferably be de-ionised water to provide a high resistance path to current flow.

The torches 10 and 20 may be used for twin plasma torch assemblies, in both open and confined processing zone chambers. The construction of confined processing zone twin plasma torch assembly 100 is shown in FIG. 9.

The assembly 100 is configured to provide torches 10, 20 which are easily installed to the correct position for operation. For example, the offset between the distal ends of the electrodes 1, 2 and the angle between them are determined by the dimensions of the assembly components.

The torch and assembly modules are constructed to close tolerance to provide good fitting between the modules. This would limit radial movement of one module within another module. To allow ease of assembly and re-assembly, corresponding modules would slide into one another and be locked in by for example, locking pins. The use of locking pins in the modules would also ensure that each module was correctly oriented within the torch assemblies ie. provide circumferential registration.

The confined processing zone twin torch assembly 100 comprises a cathode and anode torch assemblies 10 and 20, and a feed tube 112. Typically, the two torches are at right angles to one another. The components are arranged to provide a confined processing zone 110 in which coupling of the arcs will occur. The feed tube 112 is used to supply powder, liquid, or gas feed material into the processing zone 110. The walls 111 of the shroud modules 4 conveniently define the chamber which contains the confined processing zone 110.

The walls 111 provide a divergent processing zone 110 in which the low resistance wall surfaces are maintained away from the arcs, inhibiting side-arcing. In addition, the divergent nature of the design allows gas expansion after plasma coupling, without a constrictive pressure build-up.

Figure 4:
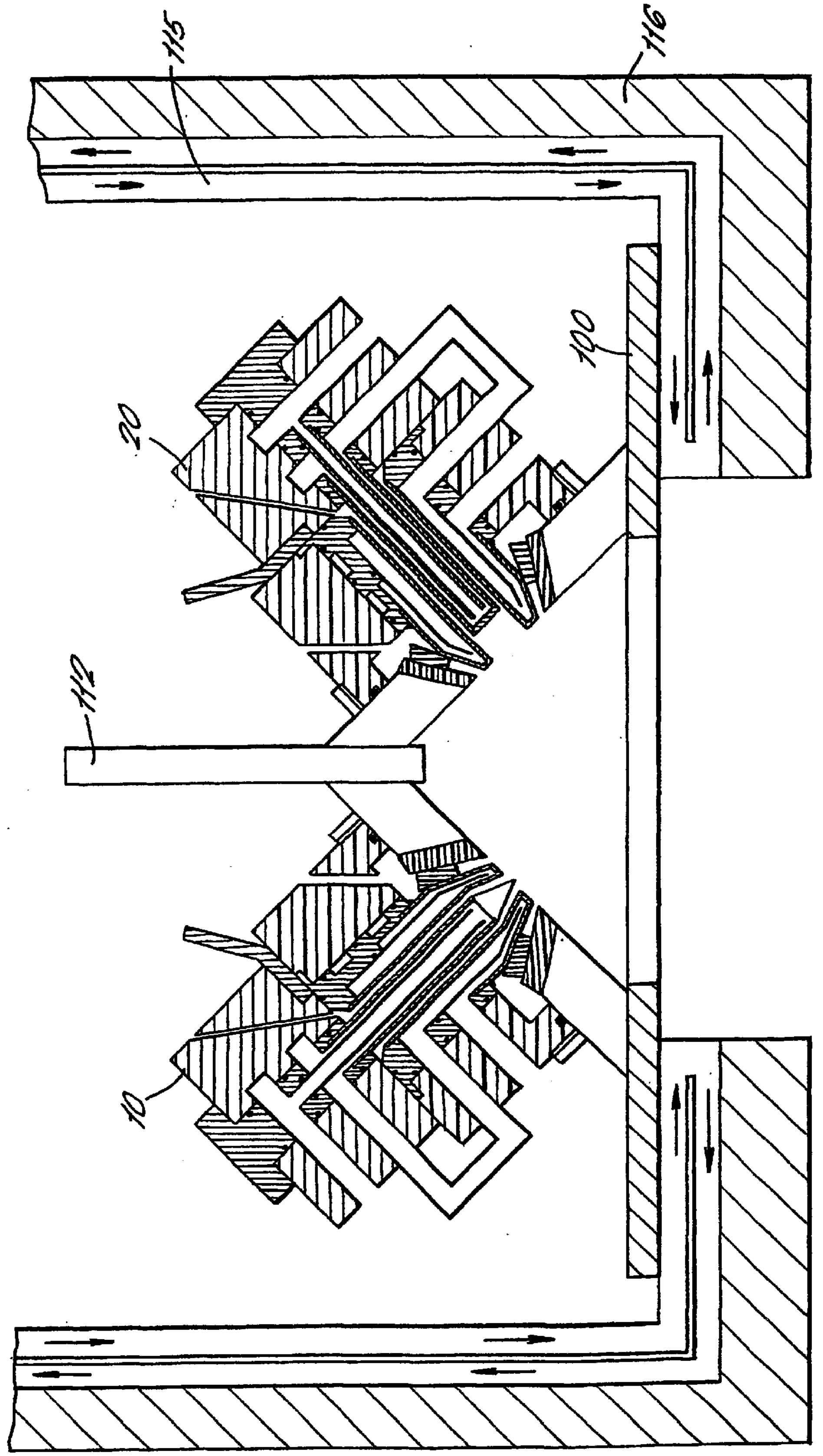
FIG. 4 shows the portable twin torch assembly of FIG. 3 mounted into a housing.

The walls 111 define a conical chamber which may comprise curved or flat walls. The perimeter of the walls 111 may be joined to chamber walls 113 to enable the assembly 100 to be mounted (FIG. 4). In such an arrangement, there should obviously be an orifice 114 such that the processing zone 110 is not totally enclosed. Typically, a circular orifice 114 can have a diameter of 15 cm.

The confined processing zone 110 may be made as a separate module comprising the feed tube 112, and the chamber walls 111 and 113.

The assembly 100 may be mounted into a cylinder which comprises (optional) inner cooling walls 115, surrounded by an outer refractory lining 116 (FIG. 4). The lining 116 would preferably be a heat resistant material. The walls 111 may themselves also have integrated cooling channels.

Turning now to the operation of the torches 10, 20, a shroud gas is provided to encircle the arcs generated from the electrodes. The shroud gas may be helium, nitrogen or air. Any gas which provides a high resistance path to prevent the arc from travelling through the shroud is suitable. Preferably, the gas should be relatively cold. The high resistance path of the shroud gas concentrates the arc into a relatively narrow bandwidth. The tapered distal end of the nozzle module assists in providing a gas shroud which is directed to encircle the arc.

The shroud gas also acts to confine the plasma and inhibits melted feed material from being recirculated back towards the feed tube 112 or the chamber walls 111. Thus, the efficiency of processing is increased.

As the distal end of the nozzle no longer protrudes into the confined processing zone, precipitation of melted feed material on the nozzle is inhibited. Thus, the operational life of the nozzle is prolonged, and the efficiency of the material processing increased.

Any regions of the assembly which are particularly close to the arcs are made or coated with an electrical insulator, for example the shroud gas guide 42 and the electrical insulator 43.

The invention may be applied to numerous practical applications, for example to manufacture nano-powders, spherodisation of powders or the treatment of organic waste. Some further examples are given below.

1. Gas Heater/Steam Generator

Due to the modular nature, the invention allows replacement of existing gas fossil fuel burners with an electrical gas heater. Introducing water between the two torches will enable steam to be generated which may be used to heat existing kilns and incinerators. Gasses may be introduced between the arcs to give an efficient gas heater.

2. Pyrolysis/Gas Heating and Reforming

Introduction of liquid and/or gas, and/or solids into the coupling zone will enable thermal treatment.

3. Reactive Material Processing

Materials which dissociate into chemically reactive materials may be processed in the unit as there need not be any reactor wall contact at high temperatures.

In such cases, the walls 111 of the water cooled processing zone chamber would have a grated surface to allow transpiration to occur. This creates a protective barrier to stop reactive gas impingement.

4. Ultra-fine Powder Production

Figure 5:
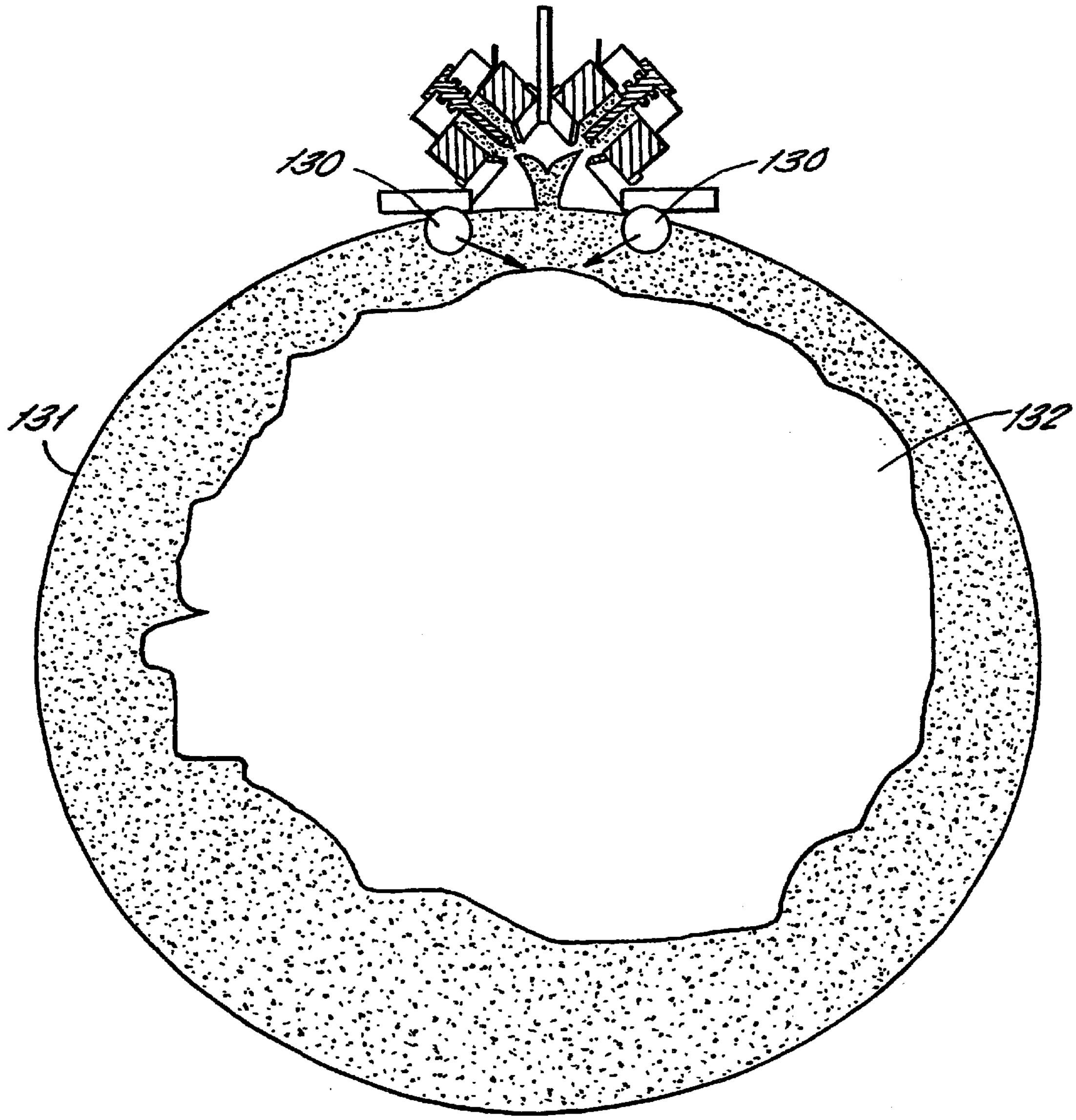
FIG. 5 is a schematic of the assembly of FIG. 3 when used to produce ultra fine powders.

The assembly may be utilised to produce ultra fine powders (generally of unit dimension of less than 200 nanometres) is illustrated in FIG. 5. The small size of the unit enables easy attachment of a quench ring 130 in close proximity to the gaseous high temperature plasma coupling zone. Fine powder is produced in the zone 132, within the expansion zone 131. Higher gas quench velocities produce smaller the terminal unit dimension of the particles.

A plurality of twin torch assemblies as herein described may be mounted on a processing chamber.

It is expected that the nano-powders produced by this method would produce finer powders as it would be possible to install the quench apparatus 130 in close proximity to the arc to arc coupling zone. This would minimise the time available for the powder/liquid feed material particles to grow.

It will be appreciated that composite materials may be fed to make nano-alloy materials.

Introduction of fine powders, gasses or liquids between the arc will vaporize them and the vapor may then be quenched/and or reacted to give a powder of nano-sized powders.

5. Coupled or Transferred Arc Mode

Figure 6A:
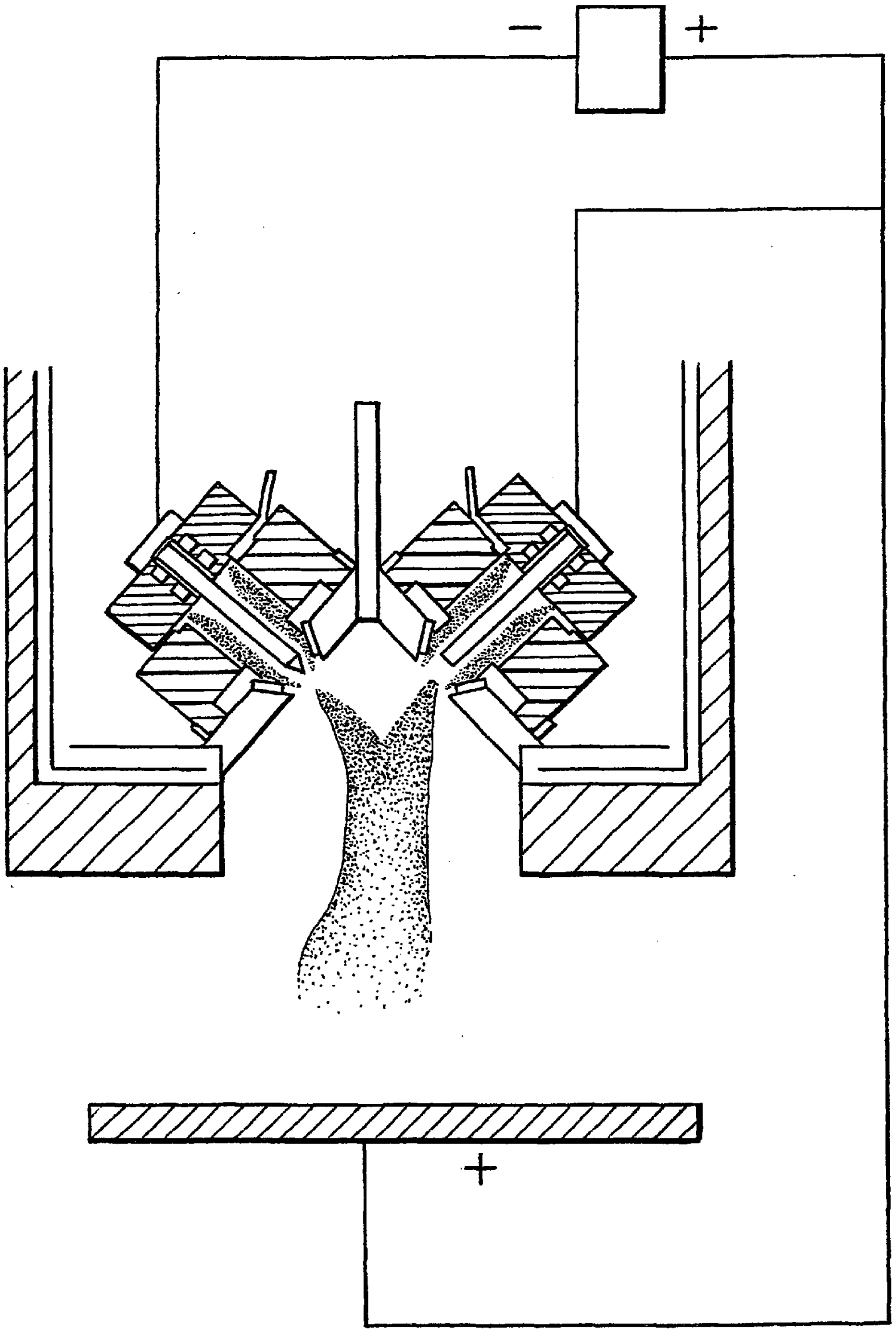
FIG. 6A is a schematic of the assembly of FIG. 4 configured to operate in transferred arc to arc coupling mode, with a anode target.
Figure 6B:
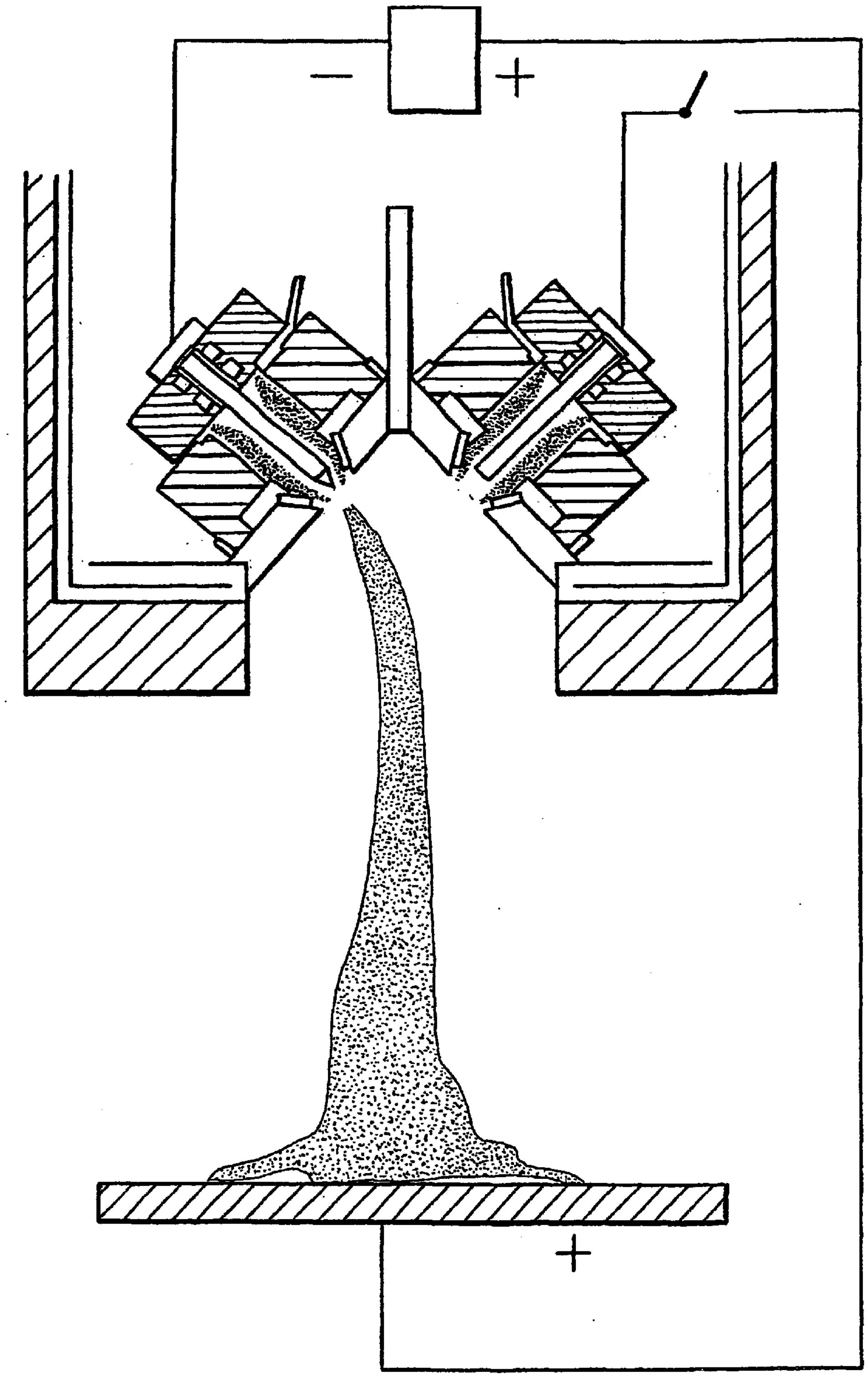
FIG. 6B is a schematic of the assembly of FIG. 4 configured to operate in transferred arc mode, with a anode target.
Figure 7A:
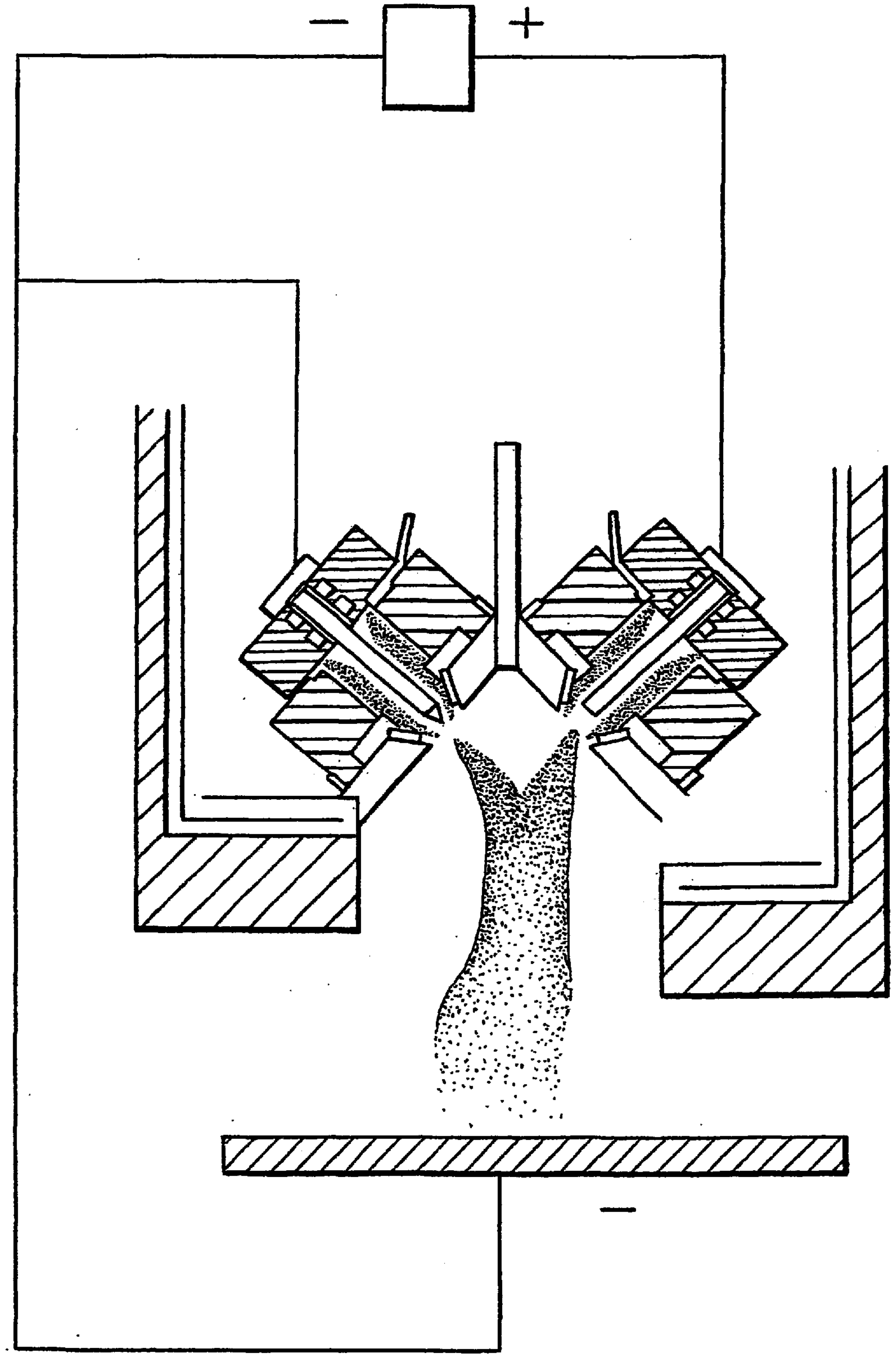
FIG. 7A is a schematic of the assembly of FIG. 4 configured to operate in transferred arc to arc coupling mode, with a cathode target.
Figure 7B:
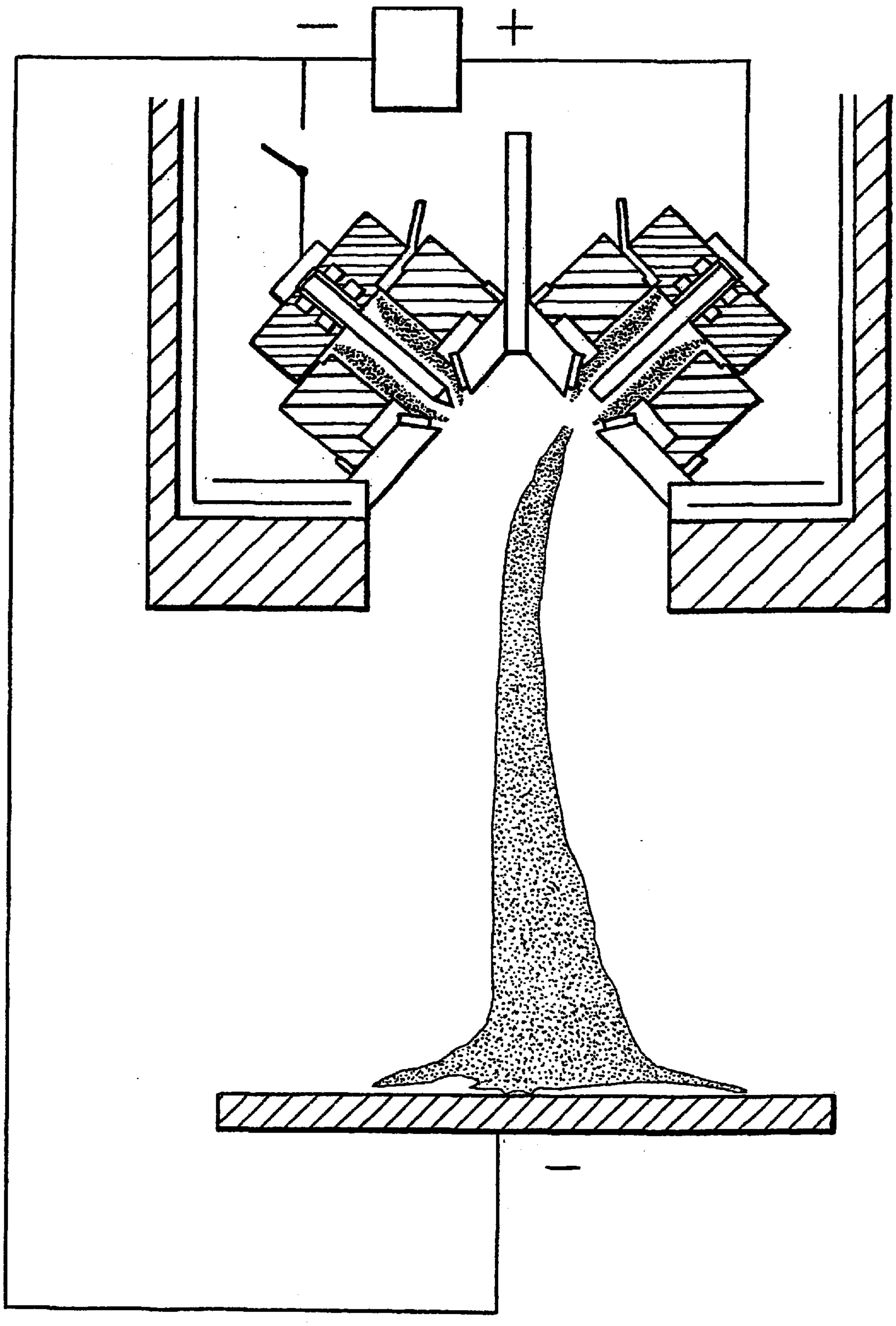
FIG. 7B is a schematic of the assembly of FIG. 4 configured to operate in transferred arc mode, with a cathode target.

The modular assembly may also be configured as to operate in transferred arc modes with anode (FIG. 6) and cathode (FIG. 7) targets. The torches described above are suitable for operation in transferred arc to arc coupling mode (FIGS. 6A and 7A) and transferred arc mode (FIGS. 6B and 7B).

6. Spherodisation

Typical plasma gas temperatures at the arc to arc coupling zone have been measured to be up to 10,000 K for an Argon plasma. Introduction of angular particles results in spherodisation.

7. Thermal Modification/Etching/Surface Modification

The Coupling zone between the arcs may be used to thermally modify a feed gas, for example methane, ethane or UF6.

The plasma plume may also be used to achieve surface modification by, for example, ion impingement, melting, or to chemically alter the surface such as in nitriding.

8. ICP Analyses

The assembly according to the present invention may also be used in ICP analyses and as a high energy UV light source.

Various modifications can be made to the above embodiments. For example, cooling water systems of the two torches may be combined, or one or both of the torches of the twin apparatus could have a gas shroud. In addition, the gas shroud may be applied to torches which do not have the modular construction mentioned above.

The apex cone angle in the torch assembly may be different for different applications. In some cases it may be desirable to fit to a cylinder without a cone.

A plurality of twin torch assemblies as herein described may be mounted on chamber.

What is claimed is:

1. A twin plasma torch assembly comprising:

(a) at least two plasma torch assemblies of opposite polarity supported in a housing, said assemblies being spaced apart from one another and comprising (i) a first electrode, (ii) a second electrode which is or is adapted to be spaced apart from the first electrode by a distance sufficient to achieve a plasma arc therebetween in a processing zone;

(b) a passage for introducing a plasma gas into the processing zone around each electrode;

(c) a further passage for introducing shroud gas to surround the plasma gas;

(d) a feed tube for supplying feed material into the processing zone; and (e) a power source for generating a plasma arc in the processing zone;

characterised in that distal ends of first and second electrodes do not project beyond the housing.

2. A twin plasma torch assembly as claimed in claim 1, wherein each torch has a distal end for the discharge of plasma gas, wherein the further passage for supplying shroud gas provides shroud gas downstream of the distal end of each electrode.

3. A twin plasma torch assembly as claimed in claim 2, wherein each torch comprises a housing which surrounds the electrodes to define the shroud gas supply duct between the housing and the electrodes, and wherein the end of the housing is tapered inwards towards the distal end of the torch to direct flow of the shroud gas around the plasma gas.

4. An assembly as claimed in claim 1, further comprising a collection zone for collecting processed feed material in the form of a powder.

5. An assembly as claimed in claim 4, further comprising means to transport processed feed material to the collection zone.

6. An assembly as claimed in claim 5, wherein the means to transport processed feed material to the collection zone comprises means to provide a flow of fluid through the chamber, wherein, in use, processed feed material is entrained in the fluid flow and is thereby transported to the collection zone.

7. An assembly as claimed in claim 1, wherein distal ends of first and second electrodes for the discharge of plasma gas do not project beyond the housing.

8. An assembly as claimed in claim 1, wherein distal ends of the first and/or second electrodes for the discharge of plasma gas is/are formed from graphite.

9. An assembly as claimed in claim 1, further comprising cooling means for cooling and condensing material which has been vaporised in the processing zone.

10. An assembly as claimed in claim 9, wherein the cooling means comprises a source of a cooling gas or a cooling ring.

11. An assembly as claimed in claim 1, wherein the power source for generating a plasma arc in the processing zone between the first and second electrodes comprises a DC or AC power source.

12. A plasma arc reactor comprising a combination of a reaction chamber and a twin plasma torch assembly according to claim 1.

13. A reactor according to claim 12, wherein the chamber has an elongate form with a plurality of orifices in a wall portion thereof; and a twin plasma torch assembly according to any one of the preceding claims being mounted over each orifice.

14. A reactor as claimed in claim 13, wherein the chamber has a tubular portion with a plurality of orifices in a wall portion thereof, a twin plasma torch assembly being mounted over each orifice.

15. A reactor as claimed in claim 14, wherein said orifices are provided along and/or round said tubular portion.

16. A reactor as claimed in claim 13, wherein said orifices are provided at substantially regular intervals.

17. A process for producing a powder from a feed material, which process comprises:

(A) providing a plasma arc reactor as defined in claim 12;

(B) introducing a plasma gas into the processing zones between the first and second electrodes;

(C) generating a plasma arc in the processing zones between the first and second electrodes;

(D) supplying feed material into the plasma arcs, whereby the feed material is vaporised;

(E) cooling the vaporised material to condense a powder; and (F) collecting the powder.

18. A process as claimed in claim 17, wherein the feed material comprises or consists of a metal or alloy.

19. A process as claimed in claim 18, wherein the feed material is aluminium or an alloy thereof.

20. A process as claimed in claim 17, wherein the feed material is in the form of a wire, fibres and/or a particulate.

21. A process as claimed in claim 17, wherein the plasma gas comprises or consists of an inert gas.

22. A process as claimed in claim 21, wherein the plasma gas comprises or consists of helium and/or argon.

23. A process as claimed in claim 17, wherein at least some cooling of the vaporised material is achieved using an inert gas stream.

24. A process as claimed in claim 17, wherein at least some cooling of the vaporised material is achieved using a reactive gas stream.

25. A process as claimed in claim 17, wherein the surface of the powder is oxidised using a passivating gas stream.

26. A process as claimed in claim 25, wherein the passivating gas comprises an oxygen-containing gas.

27. A process as claimed in claim 17, wherein the powder comprises particles substantially all of which have a diameter of less than 200 nm, preferably less than 50 nm.

* * * * *